(12) United States Patent
Lee et al.

(10) Patent No.: US 8,444,885 B2
(45) Date of Patent: May 21, 2013

(54) METHOD FOR MAKING PRIVACY FILM

(75) Inventors: Dong-Wook Lee, Daejeon (KR); Soon-Yeel Lee, Daejeon (KR); In-Seok Hwang, Daejeon (KR); Seung-Heon Lee, Daejeon (KR); Sang-Ki Chun, Daejeon (KR); Jie-Hyun Seong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 207 days.

(21) Appl. No.: 12/811,457

(22) PCT Filed: Dec. 29, 2009

(86) PCT No.: PCT/KR2009/000442
§ 371 (c)(1),
(2), (4) Date: Jul. 1, 2010

(87) PCT Pub. No.: WO2009/096722
PCT Pub. Date: Aug. 6, 2009

(65) Prior Publication Data
US 2010/0295196 A1 Nov. 25, 2010

(30) Foreign Application Priority Data
Jan. 29, 2008 (KR) .................. 10-2008-0008997

(51) Int. Cl.
*B29D 11/00* (2006.01)
(52) U.S. Cl.
USPC .................................................. 264/1.38
(58) Field of Classification Search .................. 264/1.38
See application file for complete search history.

(56) References Cited

U.S. PATENT DOCUMENTS

| | | |
|---|---|---|
| 6,297,906 B1 | 10/2001 | Allen et al. |
| 2006/0012059 A1 | 1/2006 | Cheng et al. |
| 2007/0084549 A1 | 4/2007 | Graham et al. |
| 2007/0087186 A1* | 4/2007 | Clarke et al. .................. 428/323 |
| 2008/0016686 A1 | 1/2008 | Lee et al. |
| 2009/0115943 A1* | 5/2009 | Gaides ........................... 349/96 |

FOREIGN PATENT DOCUMENTS

| | | |
|---|---|---|
| JP | 02-089610 | 3/1990 |
| JP | 03-235233 | 10/1991 |
| JP | 11-059094 A | 3/1999 |
| JP | 2003-198185 | 7/2003 |
| JP | 2005-041125 | 2/2005 |
| JP | 2005-66836 | 3/2005 |
| JP | 2005-519146 | 6/2005 |
| JP | 2007-125699 | 5/2007 |
| JP | 2007-272065 A | 10/2007 |
| KR | 10-0763837 | 10/2007 |
| WO | WO 03/072625 | 9/2003 |
| WO | WO 2005/021260 | 3/2005 |
| WO | WO 2006/031455 | 3/2006 |
| WO | WO 2007/108444 | 9/2007 |

* cited by examiner

*Primary Examiner* — Larry Thrower
(74) *Attorney, Agent, or Firm* — McKenna Long & Aldridge, LLP

(57) ABSTRACT

Provided is a method for making a privacy film. In the method, a nickel mold having desired intagliated patterns are prepared, and a curable resin is then injected into the nickel mold to prepare a master mold. A UV curable resin is injected into the master mold, and then cured to thereby form a film where uneven patterns are formed. A black ink is injected into a concave portion of the film. The method provides advantages such as process simplicity, excellent production efficiency, and low fabrication cost.

16 Claims, 1 Drawing Sheet

METHOD FOR MAKING PRIVACY FILM

This application is a 35 U.S.C. §371 National Stage entry of International Application No. PCT/KR2009/00442, filed on Jan. 29, 2009, and claims priority to Korean Application No. 10-2008-0008997, filed on Dec. 29, 2008, which are all hereby incorporated by reference in their entireties.

TECHNICAL FIELD

The present invention relates to a method for making a privacy film, and more particularly, to a method that can easily make a privacy film used for a notebook, a mobile phone, an ATM, etc., using a mold.

BACKGROUND ART

Recently, privacy films are increasingly used for a notebook, a mobile phone, an automated teller machine (ATM), etc., due to privacy protection and security preservation. In addition, privacy films are diversely applied to various fields, such as an immigration checkpoint at airport, a computer room at school, a library, a certificate issuing machine at a ward or village office, and the like.

A privacy film limiting a viewing angle is a film of which light transmittance varies with an incidence angle of light. In general, the light transmittance of the privacy film is highest at a front face of a film, and gradually decreases from the front face to a side face. Therefore, when a privacy film is mounted on a monitor, a user at the front face is able to see the contents displayed on a screen freely but others deviating from the front face (deviating from the front face by 30 or more) can see only a dark and black screen. This makes it possible to prevent information from being leaked out to other person.

Privacy films, which are popularly used at present, are films made and sold by the 3M Company. The privacy films of the 3M Company are made in such a manner that a black material absorbing light and a transparent material transmitting light are alternatingly stacked, and the resultant structure is thinly cut along a direction perpendicular to a stacked direction. According to this method, the black material absorbing light form a predetermined pattern (hereinafter, referred to as 'black pattern') and such black patterns are arranged in plurality. Light incident from the front face onto the privacy film can be transmitted, but light incident onto the privacy film at a predetermined angle or more is absorbed into the black pattern and thus cannot be transmitted. Accordingly, the privacy film can provide the viewing angle limiting effect that only a user at the front face can see the contents displayed on the screen, but bystanders deviating from the front face cannot see the contents displayed on the screen.

However, the above method for making a privacy film has several limitations such as process complexity and high fabrication cost because two materials should be alternatingly coated.

DISCLOSURE OF INVENTION

Technical Problem

An aspect of the present invention provides a method for making a privacy film that is simple, convenient, and cost-effective.

Technical Solution

According to an aspect of the present invention, there is provided a method for making a privacy film, including: preparing a nickel mold having desired intagliated patterns; injecting a curable resin into the nickel mold to prepare a master mold; injecting a ultraviolet (UV) curable resin into the master mold, and then curing the UV curable resin to form a film where uneven patterns are formed; and injecting a black ink into a concave portion of the film.

The preparing of the nickel mold may include: sputtering copper onto a glass substrate; forming a resist pattern; plating nickel on a portion where the resist pattern is not formed; and removing the resist pattern.

The forming of the resist pattern may include: forming a resist on the copper layer; selectively exposing the resist using a photomask; and developing the exposed resist with a developing solution to form a pattern.

The plating of the nickel may be performed using electroless plating. Before the plating of the nickel, the method may further include forming a catalyst layer for nickel plating. The catalyst may include at least one selected from the group consisting of palladium chloride, palladium, platinum, gold and ruthenium.

The curable resin may be silicon resin and in this case the master mold may be formed in a plate shape or a roll shape.

The UV curable resin may be selected from the group consisting of multifunctional acrylate, acryl-based oligomer and acryl-based polymer, and the UV curable resin may be used by adding a UV initiator generally.

The functional aerylate may include dipentaerythritol pentaacrylate, hexanediol diacrylate, pentaerythritol triacrylate, diacrylate ester of bisphenol-A epoxy resin, or the like. The acryl-based oligomer may include methacryl oligomer. The acryl-based polymer may include polymethylmethacrylate, urethaneacrylate, etheracrylate, epoxyacrylate, esteracrylate, or the like.

The UV initiator may include acetophenone, thioxanthone, benzoyl ether, benzyl dimethyl ketal, benzophenone, bisacylphosphine oxide, α-hydroxyketone, and so forth.

The black ink may be selected from the group consisting of an inorganic ink including a carbon black ink, a graphite ink and an iron-oxide ink, and an ink that is made black by mixing an azo-based pigment or phthalocyanine-based pigment.

A ratio of an inter-pattern space to a pattern linewidth in the privacy film may range from approximately 1:3 to approximately 5:1, preferably, from approximately 1:1 to approximately 5:1, most preferably, from approximately 3:1 to approximately 5:1.

A ratio of a pattern height to an inter-pattern space in the privacy film may range from approximately 1:2 to approximately 2:1, preferably, from approximately 1:2 to approximately 2:1, most preferably, from approximately 1:1 to approximately 2:1.

Advantageous Effects

According to the present invention, a method for making a privacy film provides several advantages such as process simplicity and low fabrication cost because the method is performed using a mold. Furthermore, since a mold pattern is formed using a resist film, it is possible to form delicate and fine patterns, and it is easy to control an inter-pattern space or a pattern height as well.

BRIEF DESCRIPTION OF DRAWINGS

The above and other aspects, features and other advantages of the present invention will be more clearly understood from the following detailed description taken in conjunction with the accompanying drawings, in which.

BEST MODE FOR CARRYING OUT THE INVENTION

Exemplary embodiments of the present invention will now be described in detail with reference to the accompanying drawings.

Figure 1:
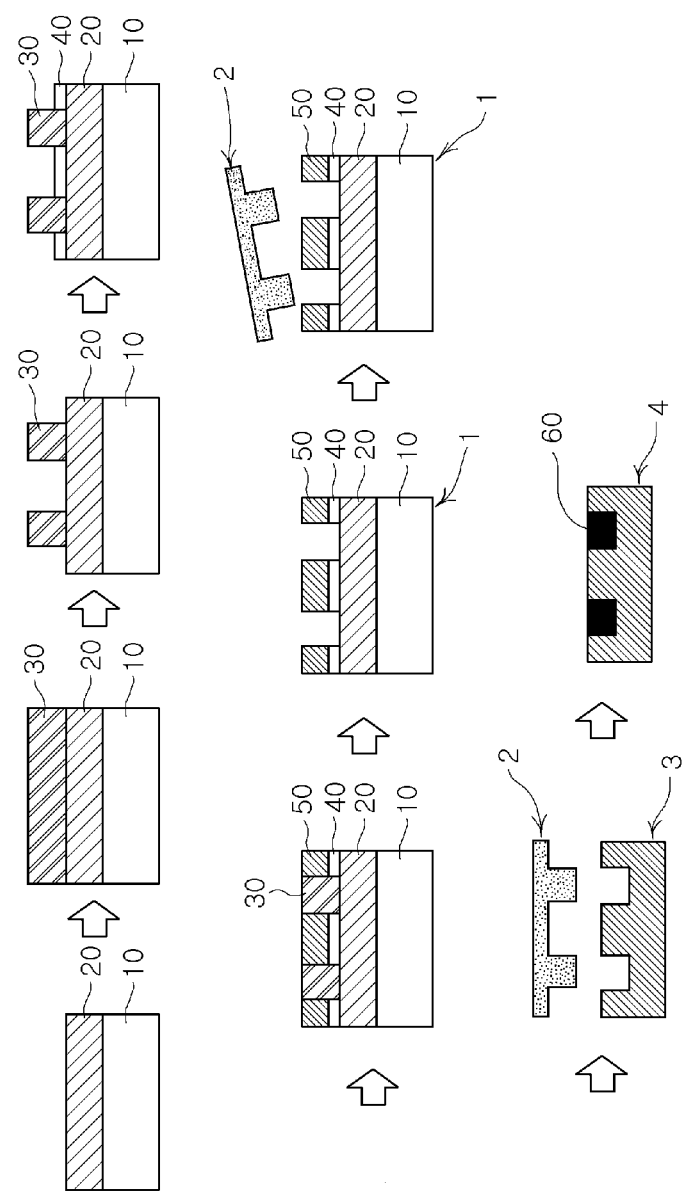
FIG. 1 illustrates a method for making a privacy film of the present invention.

FIG. 1 illustrates sequential processes of a method for making a privacy film according to the present invention.

Referring to FIG. 1, the method for making a privacy film according to the present invention includes: (1) preparing a nickel mold; (2) preparing a master mold; (3) forming a film; and (4) injecting an ink.

(1) Preparing of Nickel Mold

A nickel mold 1 used in the present invention is provided for preparing a master mold 2. The preparing of the nickel mold 1 includes: (i) sputtering copper onto a glass substrate; (ii) forming a resist pattern; (iii) plating nickel on a copper layer where the resist pattern is not formed; and (iv) removing the resist pattern.

These operations are performed to prepare the nickel mold 1 having uneven patterns where convex and concave portions are formed. In the present invention, a master mold 2 to be described later will be made using the nickel mold 1 having the uneven patterns, and a film 3 is then formed by the use of the master mold 2. Thus, patterns formed on the nickel mold 1 can be transferred onto the film 3, which will be more fully described later.

Herebelow, a method for preparing a nickel mold 1 will be described in detail.

(i) Sputtering

First, copper particles are spurted onto a glass substrate 10 to thereby form a copper layer 20. This is because the copper layer 20 facilitates the formation of a catalyst layer 40 to be described later. If the glass substrate 10 is directly used without the copper layer 20, a catalyst is not adhered well so that nickel plating is not performed easily.

The sputtering can be performed using a related art method that is well known in the art, but there is no specific limitation. For example, the sputtering may be performed with a power of approximately 2 kW to approximately 10 kW under a vacuum state of approximately 2 mtorr to approximately 5 mtorr in an argon atmosphere.

(ii) Forming of Resist Pattern

Thereafter, a resist layer 30 is formed on the copper layer 20, and development and exposure is performed on the resist layer 30 to form a resist pattern.

Although any resist known in the art is available in the method of the present invention only if it can be used to form a desired pattern, a dry film resist may be more appropriate in particular. Since the dry film resist does not require a coating apparatus and it can be directly attached to a product, it is especially useful in fabricating a large-sized product, and there is little possibility of thickness nonconformity during the coating process.

When a liquid resist is used, the resist layer 30 can be formed on the cupper layer 20 using a well-known method such as a spin-on-coating and a spray coating. When a dry film resist is used, the resist layer 30 can be formed by attaching it on a cupper layer 20.

When the resist layer 30 is formed on the copper layer 20 in this way, a photolithography process is performed on the resist layer 30 to form a resist pattern. That is, the resist layer 30 is selectively exposed using a photomask, developed with a developing solution, and finally the resist pattern is formed.

The process of forming the resist pattern is well known in the art. Conditions for the development and exposure may vary with a kind of a resist, a shape of a pattern, and so forth, but a person of ordinary skill in the art can find out optimum conditions suitable for obtaining desired results through routine experiments.

The developing solution may include a typical developing solution used for resist development in the art, and particularly a weak alkaline developing solution such as sodium carbonate ($Na_2CO_3$) and potassium hydroxide (KOH) may be used.

Through the exposure and development, the resist on a specific portion remains and the resist outside the specific portion is dissolved by the developing solution so that the copper layer is exposed.

(iii) Nickel Plating

Afterwards, nickel 50 is plated on the portion where the copper layer is exposed.

The nickel plating can be performed using a general plating method used in the art, for example, electroplating or electroless plating. In particular, the electroless plating may be more useful.

However, when the nickel plating is performed through the electroless plating, a catalyst layer 40 may be further formed on the copper layer 20 before the nickel plating. The catalyst layer 40, which facilitates the electroless plating, can be formed by dipping a substrate into a catalyst solution containing catalysts. The catalyst may include a metal catalyst such as palladium chloride, palladium, platinum, gold and ruthenium.

When the substrate is dipped into the catalyst solution, the catalysts are selectively adhered to a resist-free portion where the copper layer is exposed, and resultantly the catalyst layer is formed only on the resist-free portion.

After the catalyst layer 40 is formed, the electroless plating is performed by dipping the substrate into a plating solution.

(iv) Removing of Resist Pattern

When the nickel plating is completed, the resist which remains on the cupper layer 20 is removed, and a nickel surface is grinded to thereby completing the nickel mold 1.

The removing of the resist pattern may be performed through typical removal methods used in the art, for example, by dipping the resultant structure into a strong alkaline aqueous solution such as KOH aqueous solution or by heating it at a high temperature.

After the resist pattern is removed, the nickel surface is planarized through the grinding process, thereby completing the nickel mold 1. The nickel mold 1 prepared by the inventive method has uneven patterns where concave and convex portions are formed.

(2) Preparing of Master Mold

When the nickel mold 1 is prepared, a resin or the like is injected into the nickel mold 1 to form a master mold 2 where intagliated patterns having an inverse shape of the nickel mold pattern are formed.

The master mold 2 of the present invention can be prepared using a related art method well known in the art, for example, a method of injecting a curable resin into the nickel mold 1 and then curing it.

The resin for the master mold may include a silicon resin. This is because the master mold can be formed in a roll shape as well as a plate shape when the silicon resin with flexibility is used for a material of the master mold. That is, it is possible to form a plate-shaped mold by attaching the separated master mold to a hard plate. Alternatively, it is possible to form a roll-shaped master mold by winding it around a stainless steel (SUS) roll.

The shape of a film that is finally made depends on the shape of the master mold. That is, if the plate-shaped master mold is used, a plate-shaped film is made; and, if the roll-shaped master mold is used, a roll-shaped film is made. Therefore, the master mold having a desired shape can be fabricated and used whenever necessary.

(3) Forming of Film

Next, a film 3 is formed by injecting an ultraviolet (UV) curable resin into the prepared master mold 2 and then curing it. The UV curable resin may have excellent transmittance. For example, the UV curable resin may include multifunctional acrylate, acryl-based oligomer or acryl-based polymer.

The functional acrylate may include dipentaerythritol pentaacrylate, hexanediol diacrylate, pentaerythritol triacrylate, diacrylate ester of bisphenol-A epoxy resin, or the like. The acryl-based oligomer may include methacryl oligomer. The acryl-based polymer may include polymethylmethacrylate, urethaneacrylate, etheracrylate, epoxyacrylate, esteracrylate, or the like.

However, these compounds are examples of the UV curable resin available in the method of the present invention, and thus various kinds of curable resins used in the art may be used instead of them.

An UV initiator may be added to the resin. For example, the UV initiator may include acetophenone, thioxanthone, benzoyl ether, benzyl dimethyl ketal, benzophenone, bisacylphosphine oxide, α-hydroxyketone, and so forth.

Inverse patterns of the master mold 2, that is, the patterns having the same shape as the uneven patterns of the nickel mold 1, are formed on the film 3. A black ink 60 to be described later is injected into the concave portion of the film 3, thus completing a privacy film where black patterns absorbing light are formed at regular intervals.

(4) Injecting of Ink

When the film 3 having the uneven patterns is formed, a black ink 60 is injected into the concave portion of the film 3 to thereby form a black pattern. The black ink 60 may include an inorganic ink such as a carbon black ink, a graphite ink and an iron-oxide ink, or an ink that is made black by mixing a colored pigment such as an azo-based pigment or phthalocyanine-based pigment.

The black ink 60 may be injected using various ink injecting methods used in the art. For example, the film 3 is coated with the black ink 60, and a surface of the film 3 is then scraped with a doctor blade so that the ink is removed on the convex portion and is injected into the concave portion.

Figure 2:
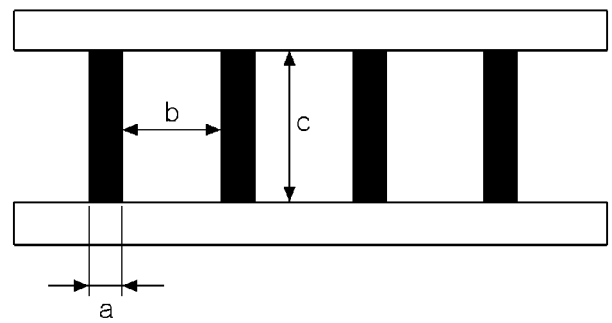
FIG. 2 is a sectional view of a privacy film made by the method of the present invention.

Throughout the above-described processes, the privacy film having the black patterns is formed at a desired position. FIG. 2 is a sectional view of a privacy film made by the method of the present invention.

A limited viewing angle and light transmittance of the privacy film may vary with linewidth, height, space of the black pattern. More specifically, the transmittance of the privacy film depends on a ratio between an inter-pattern space b and a pattern linewidth a. The ratio of the inter-pattern space to the pattern linewidth may be 1:3 (transmittance 25%) or higher, more preferably 1:1 (transmittance 50%) or higher, most preferably 3:1 (transmittance 75%).

To achieve the viewing angle limiting effect, a ratio of a height of the black pattern to the pattern linewidth should also increases in proportion to the increased ratio of the inter-pattern space to the pattern linewidth. The height of the black patterns depends on a height of the resist pattern of nickel mold. Therefore, if the pattern linewidth is great, the resist height should increase correspondingly to achieve the viewing angle limiting effect, but the increase of the resist height causes a shape of the pattern to be bad during exposure/development. On the contrary, if the linewidth is too small, a contact area with the surface of the copper layer is too small during exposure/development so that the resist may be detached from the copper layer. Thus, the ratio of the inter-patter space to the pattern linewidth may be 5:1 or lower.

The limited viewing angle is determined according to a ratio of a pattern height c to the inter-pattern space b. The ratio of the pattern height c to the inter-pattern space b may be 1:3 (limited viewing angle 18.4 or higher), more preferably 1:2 or higher, most preferably 1:1 (limited viewing angle 45 or higher). Herein, the limited viewing angle means a viewing angle not allowing light to be transmitted. Privacy protection effect becomes better as the limited viewing angle becomes greater.

However, if the ratio exceeds 2:1, the resist pattern cannot be formed vertically during exposure/development but formed in a trapezoidal shape. Therefore, a linewidth of a bottom portion is increased, leading to a decrease in transmittance. Thus, the ratio of the pattern height c to the inter-pattern space b may be 2:1 or lower.

MODE FOR THE INVENTION

A copper layer was formed by sputtering copper particles onto a glass substrate, and a dry film resist (negative resist of the Kolon Industries, Inc.) was then formed on the copper layer. The dry film resist was exposed using a photomask, and thereafter developed with 1% $Na_2CO_3$ aqueous solution, thereby forming a resist pattern having a linewidth of 10 μm, an inter-pattern space of 30 μm, and a height of 30 μm.

A substrate where the resist pattern has been formed was dipped into a solution mixture for 1 to 3 minutes at a room temperature to form a catalyst layer. Herein, the solution mixture was prepared by mixing 1 L of water, 200 ml of a catalyst solution (Aurotech Activator of the Atotech Inc.) containing palladium chloride, and 50 ml of 98% sulfuric acid.

Thereafter, the substrate was dipped into a plating bath containing another solution mixture for 8 minutes so that nickel plating was performed. Herein, the solution mixture was prepared by mixing 1 L of water, 200 ml of Aurotech HP nickel M-U, 100 ml of Aurotech HP nickel A, and 10 ml of ammonia. Afterwards, the nickel-plated substrate was heated at 300° C. to remove the dry film resist, and then a nickel mold was made.

After that, a silicon resin (Sylgard 184 of the Dow Corning Inc.) is injected into the nickel mold, and then cured. Subsequently, the cured silicon resin is separated from the nickel mold to prepare a master mold.

A UV curable resin (PD-038 OF The Achesonm Inc.) is injected into the master mold and immediately cured, thereby forming a film having the same pattern as the mold pattern.

A black ink (1300Black of the Seiko Inc.) fills a concave portion by coating the film with the black ink, and thereafter the black ink applied on a convex portion is removed by scrapping the surface of the film using a doctor blade.

According to the above method, it is possible to obtain a privacy film where black patterns having a linewidth of 10 μm, a space of 30 μm, and a height of 30 μm are formed. The transmittance of the privacy film is 75% at the front face, and the limited viewing angle is ±45°.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method for making a privacy film, comprising:
    preparing a nickel mold having desired intagliated patterns;
    injecting a curable resin into the nickel mold to prepare a master mold;
    injecting a ultraviolet (UV) curable resin into the master mold, and then curing the UV curable resin to form a film where uneven patterns are formed; and
    injecting a black ink into a concave portion of the film,
    wherein preparing the nickel mold comprises: sputtering copper onto a glass substrate to form a copper layer; forming a resist pattern on the copper layer; plating nickel on a portion of the copper layer on which the resist pattern is not formed; and removing the resist pattern.

2. The method of claim 1, further comprising, before the plating of the nickel, forming a catalyst layer for nickel plating.

3. The method of claim 2, wherein the catalyst comprises at least one selected from the group consisting of palladium chloride, palladium, platinum, gold and ruthenium.

4. The method of claim 2, wherein the plating of the nickel is performed using an electroless plating.

5. The method of claim 1, wherein the forming of the resist pattern comprises:
    forming a resist on the copper layer; selectively exposing the resist using a photomask; and
    developing the exposed resist with a developing solution to form a pattern.

6. The method of claim 1, wherein the curable resin is silicon resin.

7. The method of claim 6, wherein the master mold is formed in a plate shape or a roll shape.

8. The method of claim 1, wherein the UV curable resin is selected from the group consisting of multifunctional acrylate, acryl-based oligomer and acryl-based polymer.

9. The method of claim 8, wherein the UV curable resin comprises a UV initiator.

10. The method of claim 1, wherein the black ink is selected from the group consisting of an inorganic ink consisting of a carbon black ink, a graphite ink and an iron-oxide ink; and an ink that is made black by mixing an azo-based pigment or phthalocyanine-based pigment.

11. The method of claim 1, wherein a ratio of an inter-pattern space to a pattern linewidth in the privacy film ranges from approximately 1:3 to approximately 5:1.

12. The method of claim 1, wherein a ratio of an inter-pattern space to a pattern linewidth in the privacy film ranges from approximately 1:1 to approximately 5:1.

13. The method of claim 1, wherein a ratio of an inter-pattern space to a pattern linewidth in the privacy film ranges from approximately 3:1 to approximately 5:1.

14. The method of claim 1, wherein a ratio of a pattern height to an inter-pattern space in the privacy film ranges from approximately 1:3 to approximately 2:1.

15. The method of claim 1, wherein a ratio of a pattern height to an inter-pattern space in the privacy film ranges from approximately 1:2 to approximately 2:1.

16. The method of claim 1, wherein a ratio of a pattern height to an inter-pattern space in the privacy film ranges from approximately 1:1 to approximately 2:1.

* * * * *